United States Patent

Aoki et al.

[11] Patent Number: 5,851,003
[45] Date of Patent: Dec. 22, 1998

[54] MOTOR OPERATED VALVE

[75] Inventors: Tetsuya Aoki; Tadashi Hasegawa; Tomoari Ohuchi, all of Tokyo, Japan

[73] Assignee: Fujikoki Corporation, Tokyo, Japan

[21] Appl. No.: 740,901

[22] Filed: Nov. 4, 1996

[30] Foreign Application Priority Data

May 31, 1996 [JP] Japan ................................. 8-139013

[51] Int. Cl.$^6$ .................................................. F16K 51/00
[52] U.S. Cl. ...................... 251/288; 251/129.11; 251/264
[58] Field of Search .............................. 251/129.11, 215, 251/264, 286, 288

[56] References Cited

U.S. PATENT DOCUMENTS

| | | | |
|---|---|---|---|
| 1,719,801 | 7/1929 | Duffield | 251/286 X |
| 3,651,831 | 3/1972 | Gerdner | 251/215 X |
| 3,929,317 | 12/1975 | Cohn et al. | 251/286 X |
| 4,394,873 | 7/1983 | Switall | 251/288 X |
| 4,423,752 | 1/1984 | Psarouthakis | 251/288 X |
| 4,832,311 | 5/1989 | Kimura | 251/129.11 X |

Primary Examiner—John Rivell
Attorney, Agent, or Firm—Foley & Lardner

[57] ABSTRACT

Objective To avoid undesirable contact between the moving side stopper and the fixed side stopper, to maximize the contact width at the time of hitting, to decrease damages, wearing, etc. to those stoppers, and to improve reliability of the moving side stopper and the fixed side stopper in terms of rigidity and durability. Solution To provide a motor operated valve comprising a valve body 20, a screw fed valve stem 30 and a shaft 35, a motor 10 which rotationally drive the aforementioned shaft 35, a sleeve 40 having a convexed moving side stopper 41 which is rotated with the aforementioned shaft 35 as a monolithic structure, and a fixed bearing washer having a convexed fixed side stopper 55 to which the aforementioned moving side stopper 41 hits, and where a clearance slope 41a to avoid hitting the fixed side stopper 55 is provided on the rear part, looking in the rotational direction, of the aforementioned moving side stopper 41.

3 Claims, 5 Drawing Sheets

MOTOR OPERATED VALVE

FIELD OF INVENTION

This invention relates to a motor operated valve which is incorporated into a refrigerating cycle constituting heat pump type air conditioners or refrigerators, especially the one with improved shape of a pair of stoppers provided on the screw fed moving side and the fixed side (valve body side).

BACKGROUND OF INVENTION

Conventionally, a valve as shown in FIG. 6 is used as a typical example of this kind of motor operated valves. The illustrated motor operated valve 1' basically consists of a stepping motor 10, a valve body 20, a shaft 35 and a valve stem 30, and the aforementioned shaft 35 goes up or down by a feed screw rotated by aforementioned stepping motor 10 making the valve stem 30 to go up or down, which opens or closes (changes the opening area) the fluid entrance 23 provided to the aforementioned valve body 20, resulting in the adjustement of the flow amount.

To go further into details, the aforementioned stepping motor 10 consists of a stator yoke 13 which is fitted to the periphery of a cylindrical can 11 connected to the aforementioned valve body 20 via a cover like member 18, a bobbin 14, a magnet wire 15 to which electricity is supplied from outside and which is wound around bobbin 14, a mold 12 which seals the periphery of the aforementioned stator yoke 13, the bobbin 14 and the magnet wire 15, and a rotor 39 which consists of a bond magnet fixed to the sleeve 40 to be described later and housed inside the aforementioned can 11.

Incidentally, the mold 12, the stator yoke 13, the bobbin 14 and the magnet wire 15 are fitted to the periphery of the can 11 as a monolithic structure, and they are positioned and prevented from being pulled out by fitting the hook stop convex 17a, provided on the pressed hook stop fixture 17 installed to the mold 12 by a screw 16, into one of the four concaves provided in 90° interval, for example, in the periphery of the aforementioned can 11.

The aforementioned valve body 20 is provided with a valve chest 21, and a fluid entrance 22 to which a conduit 24, communicating to the valve chest 21, is connected is provided, and another conduit 25 is connected to the bottom part of the fluid entrance 22 and another fluid entrance 23 is provided which is opened or closed by the aforementioned valve stem 30. On the upper side of the valve chest 21 of the aforementioned valve body 20, a guide bush 26, of which the internal wall is a female screw 27, is firmly fitted.

A male screw 29 provided on the outside of the holder 28 is screwed against the female screw portion 27 on the aforementioned guide bush 26, and the valve stem 30 with a flange is inserted through the lower part of the holder 28 in a way that the valve stem 30 can slide, and furthermore, a collar 34 which bears the flange of the aforementioned valve stem 30 is press fitted to the lower part of the aforementioned holder 28, and the aforementioned valve stem 30 is always pressed down by the coil spring 32 contained in a compressed condition inside the aforementioned holder 28.

At the upper part of the aforementioned holder 28, the shaft 35 is inserted and fixed in a way that they can rotate together, and at the upper periphery of the aforementioned holder 28, a sleeve 40 made of synthetic resin, to which a convexed moving side stopper 45 is provided facing downward, is molded and fixed in a way that the sleeve can rotate together with the holder.

Incidentally, the coil spring 36 is attached to the upper part of the aforementioned shaft 35. This coil spring 36 is intended to facilitate screw fitting again by pushing the aforementioned holder 28 toward the guide bush 26 side when the screw fitting between the aforementioned screws 27 and 29 is separated, after the rotor 39 is rotated (in reverse) and the shaft 35 and the sleeve 40 are lifted due to the screw fitting of the aforementioned female screw 27 and male screw 29.

Furthermore, at the upper periphery of the aforementioned guide bush 26, a fixed bearing washer 50 made of synthetic resin, to which a convexed fix side stopper 55 is provided facing upward to which the aforementioned moving side stopper 45 will hit and contact, is molded and fixed.

In the motor operated valve 1'having such a structure, when the aforementioned magnet wire 15 is excited by supplying electricity in one direction, the rotor 39, the sleeve 40, the shaft 35 and the holder 28 will rotate in normal direction (clockwise in this case) as a monolithic structure, and the aforementioned valve stem 30 is lowered due to the screw feeding by the screw fitting between the aforementioned female screw 27 and male screw 29 resulting in the aforementioned fluid entrance 23 to close.

At the time when the aforementioned fluid entrance 23 is closed, the aforementioned moving side stopper 45 has not yet reached the fixed side stopper 55, and the aforementioned holder 28, etc. are further lowered while the aforementioned valve stem 30 continues to close the aforementioned fluid entrance 23. At this time, the lowered distance of the aforementioned holder 28 against the aforementioned valve stem 30 is absorbed by the fact that the aforementioned coil spring 32 is compressed.

If the aforementioned holder 28, etc. are further rotated and lowered, the aforementioned moving side stopper 45 will hit the fixed side stopper 55 resulting in the forced stop of the rotational lowering movement by the aforementioned sleeve 40, the shaft 35, the holder 28, etc. even if the exciting of the aforementioned rotor 39 is being continued.

Some of the reasons for mechanically stopping the rotational lowering movement of each section by making the moving side stopper 45 hit the fixed side stopper 55 are; ① The mechanism is simple and most reliable, and can be realized at a low cost. ② To stop electrically, a separate means for position detection will be required and stop position will not be stable. On top of that, there are merits, such as; ③ I It can be used for detection of reference position for open loop control of the aforementioned stepping motor 10. ④ It can be used for positioning of N and S polarities of the aforementioned rotor 39.

Here, regarding the aforementioned moving side stopper 45 and the fixed side stopper 55, as they are made of synthetic resin, for example, and molded as a monolithic structure with the sleeve 40 and the fixed bearing washer 50, respectively, rigidity and durability are adequately maintained, and furthermore, the side view is made to be relatively thin and long (for example, the length of approximately 4~5 mm and the height of approximately 0.5~1 mm) and the plan view is made to be a comma-shaped bead positioned on the cocentric circle of radius r where the forward and the rear ends are semicircle shaped and both sides follow the track drawn by the aforementioned moving side stopper 45 rotated (spiral movement) around the shaft center 0 of the aforementioned shaft 35, similarly to the embodiment to be described later (see FIG. 3), and the width (thickness in the radial direction) is made to be constant (approximately 2 mm).

To further describe such forced stopping action by the moving side stopper 45 and the fixed side stopper 55 by referring to FIG. 7, while the aforementioned moving side stopper 45 is rotated and lowered in spiral movement due to the screw feed by the screw fitting between the female screw 27 and the male screw 29 as explained earlier, before making one rotation when the front part in the rotational direction hits the rear part of the aforementioned fixed side stopper 55, the separation distance between the lower surface of the aforementioned sleeve 40 (upper edge of the moving side stopper 45) and the upper surface of the fixed bearing washer (lower edge of the fixed side stopper 55) is defined as Ha, as shown by the solid line in FIG. 7(A), and there is a gap in the height direction between the moving side stopper 45 and the fixed side stopper 55. (It should be noted that each section is drawn exaggeratively in FIG. 7 for easier understanding. The same applies to other explanatory illustration of movements.)

On the other hand, the moving side stopper 45 is further lowered in spiral movement from the position indicated-by solid line in FIG. 7(A) and when its rear part has passed the front part of the fixing side stopper 55 as indicated by the virtual line in FIG. 7(A), the gap in the height direction between the moving side stopper 45 and the fixed side stopper 55 is narrowed.

And, the moving side stopper 45 is further lowered for one rotation from the position indicated by solid line in FIG. 7(A), and when its front part hits the rear part of the aforementioned fixed side stopper 55 and stopped as illustrated in FIG. 7(B), the separation distance between the aforementioned sleeve 40 and the the fixed bearing washer 50 is defined as Hb which is Ha, the aforementioned separation distance at the time of one rotation before, minus the lowered amount equivalent to one pitch of the aforementioned female screw 27 and the male screw 29 (in this case, approximately 0.6 mm for example), and the contact width in the height direction when the moving side stopper 45 hit the fixed side stopper 55 is defined as Ga which is approximately half of the aforementioned one pitch.

SUMMARY OF THE INVENTION

Here, the wider the contact width when the aforementioned moving side stopper 45 hit the fixing side stopper 55 is, in other words, the lower the height position of the moving side stopper 45 at the time of hit is, the less damage or the wearing on the moving side stopper 45 and the fixed side stopper 55, and the reliability in terms of rigidity or durability will be higher.

However, if the separation distance between the moving side stopper 45 and the fixed side stopper 55 at the time of one rotation before is set to be Hc, which is shorter than the aforementioned Ha, to increase the aforementioned contact width, there will be a danger that wearing or damage be caused or the moving side stopper 45 may be stopped due to the impact of the moving side stopper 45 hitting the fixed side stopper 55 as the rear lower surface of the moving side stopper 45 will be lower than the front upper surface position of the fixed side stopper 55 when the moving side stopper 45 passes the fixed side stopper 55. Furthermore, even if the aforementioned separation distance is set to be Ha, there is still a danger that similar failure may occur due to the tolerance of each part or variations caused during manufacturing.

Incidentally, the aforementioned failures may be avoided to some extent if the moving side stopper and the fixed side stopper are made of metal pin or that sort, but the cost will be higher due to longer time required for assembly of such pins. And if the pin is simply planted to the synthetic resin member, the pins may become loose or they will easily come off after repeated hitting, resulting in reliability problems.

This invention is made in consideration of above problems, and it is intended to provide a motor operated valve where the contact width at the time of the moving side stopper and the fixed side stopper hitting is maximized, and the damage or the wearing is decreased, thus the reliability of the moving side stopper and the fixed side stopper in terms of rigidity and durability is improved without requiring major modification to the conventional valves and at a low cost.

In order to achieve the above objective, the motor operated valve under this invention comprises a valve body having a fluid entrance, a shaft which is screw fed to open or close the aforementioned fluid entrance, a motor to drive this shaft, a sleeve having a convexed moving side stopper which is rotated with the aforementioned shaft as a monolithic structure, and a fixed bearing washer having a convexed fixed side stopper which is hit by the aforementioned moving side stopper, and a clearance slope to avoid hitting the other stopper is provided at least on one of the two sides, the aforementioned moving side stopper rear part or the aforementioned fixed side stopper front part, looking in the rotational direction of the aforementioned sleeve.

In the preferred embodiment of this invention, the aforementioned sleeve and the moving side stopper, and the aforementioned fixed bearing washer and the fixed side stopper are molded as a monolithic construction, respectively.

In the case of the motor operated valve under this invention having such a structure, as a clearance slope to avoid hitting the other stopper is provided at least on one of the two sides, the moving side stopper rear part or the fixed side stopper front part, there will be an appropriate gap between the clearance slope of the moving side stopper rear part and the fixed side stopper front part, thus undesirable hitting is avoided, when the moving side stopper passes the fixed side stopper even if the separation distance between the moving side stopper and the fixed side stopper at the time of one rotation before is set to be shorter than the conventional ones.

Furthermore, because the separation distance between the moving side stopper and the fixed side stopper at one rotation before hitting can be made shorter than the conventional one, the contact width at the time of hitting by the moving side stopper and the fixed side stopper can be maximized, and the damage or wearing can be decreased, thus the reliability of the moving side stopper and the fixed side stopper in terms of rigidity and durability can be improved without requiring major modification to the conventional ones and at a low cost.

BEST MODE OF THE INVENTION

The best mode of the invention is explained below using drawings.

Figure 1:
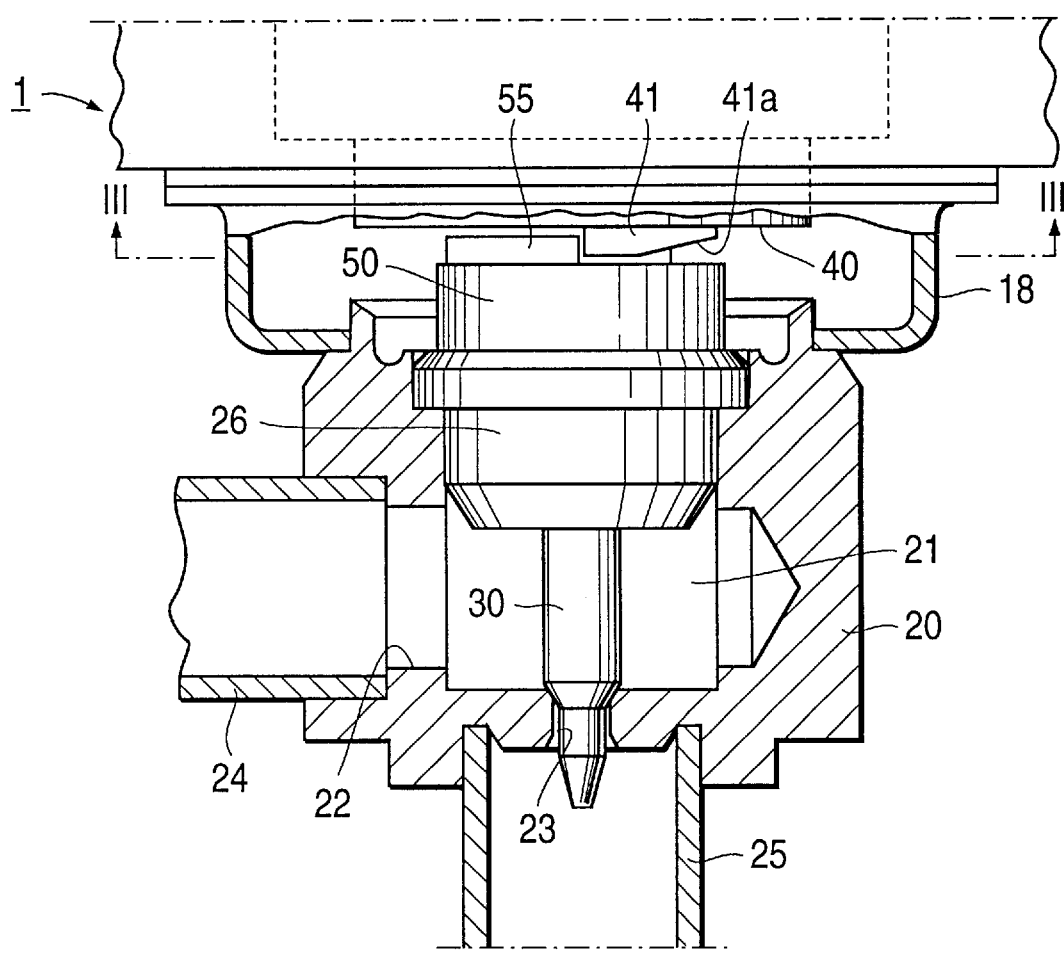
FIG. 1 describes the principal part of one example of the embodiment of the motor operated valve under this invention.
Figure 6:
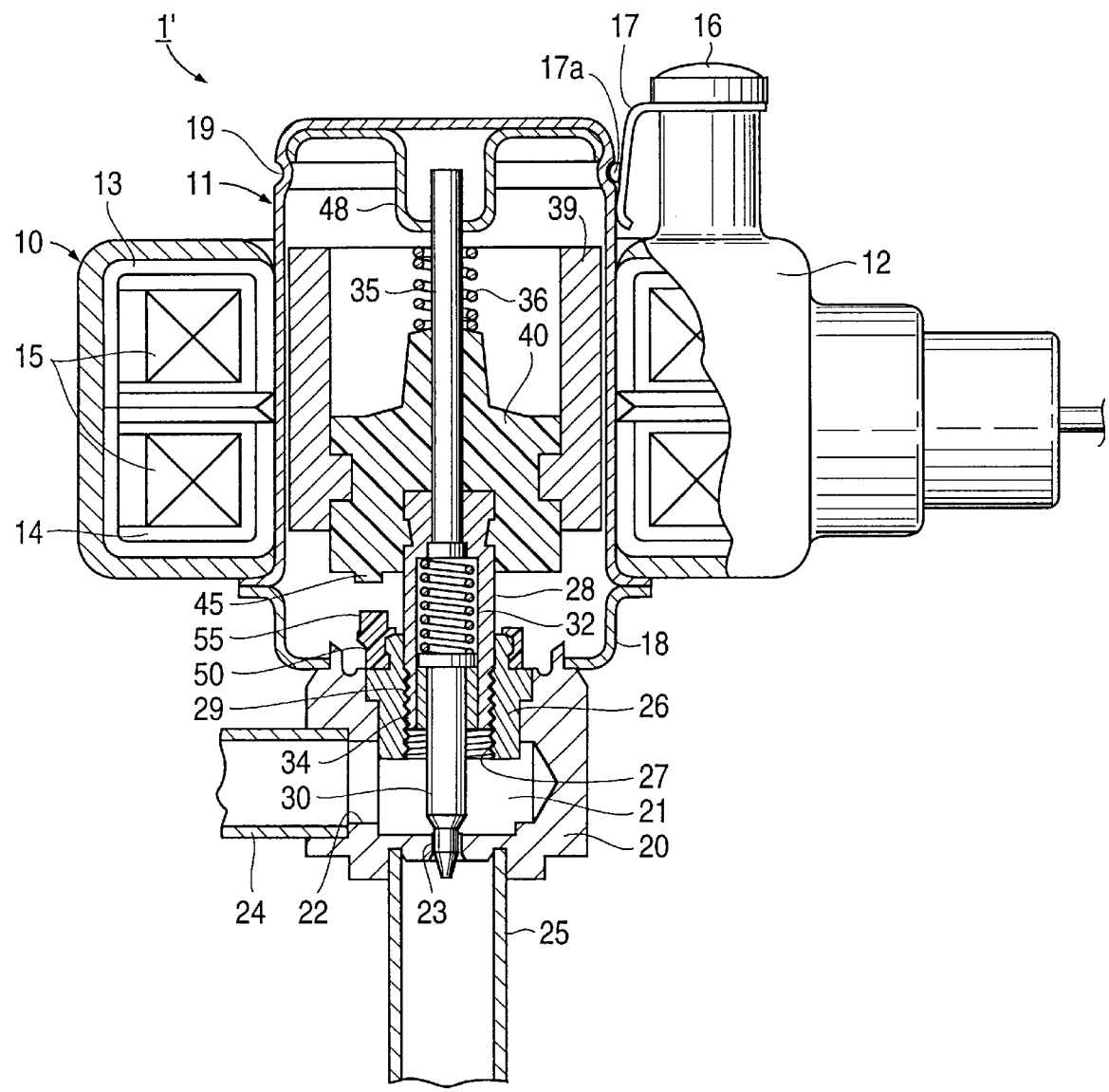
FIG. 6 is a partially cutaway front view describing one example of the conventional motor operated valve.

FIG. 1 describes a principal part of one example of the embodiment of the motor operated valve under this invention. As the motor operated valve 1 under this embodiment is different from the aforementioned conventional motor operated valve 1' described in FIG. 6 in the shape of the moving side stopper 45 only and that other parts are of the same construction, the explanation of each part of the aforementioned conventional motor operated valve 1' of the same construction will be omitted by assigning the same symbol to it and the explanation will be concentrated in the differences.

Figure 2:
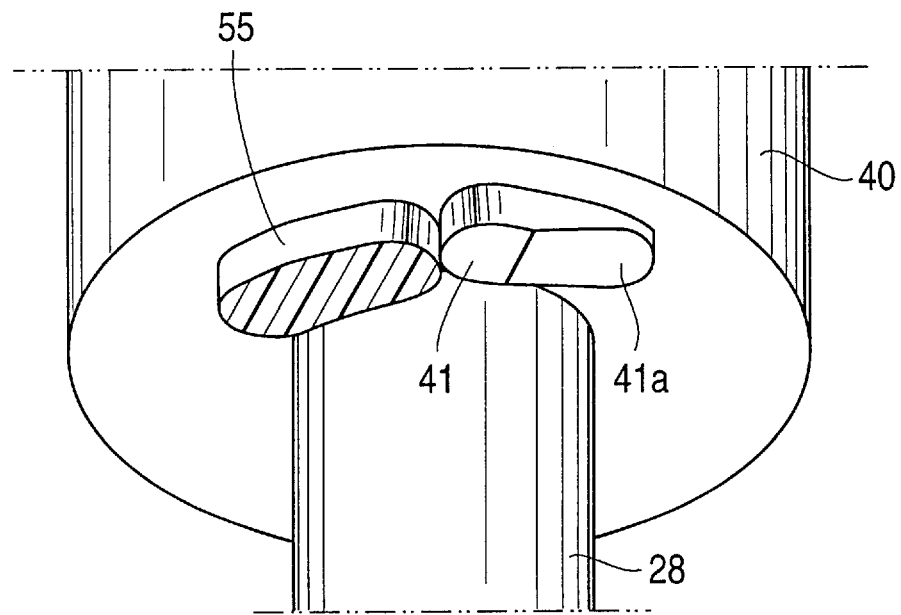
FIG. 2 is a magnified perspective view describing the moving side stopper and the fixed side stopper shown in FIG. 1.
Figure 3:
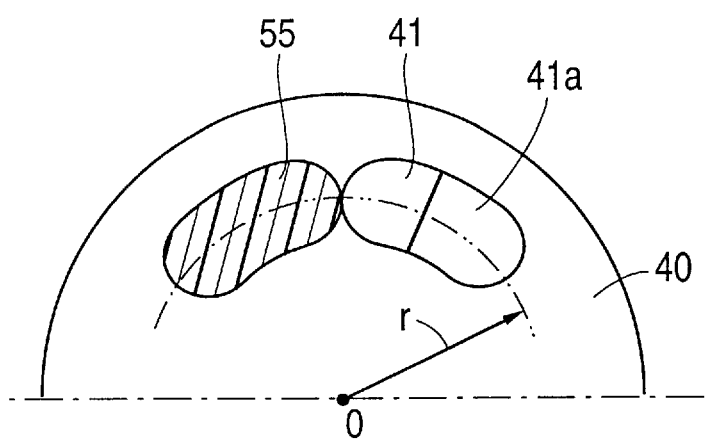
FIG. 3 is a magnified top plan view describing the moving side stopper and the fixed side stopper shown in FIG. 1.

As you will see more clearly by referring to FIGS. 2~4 in addition to FIG. 1, in this form of embodiment, the fixed side stopper 55 is structured the same as the conventional one, and the moving side stopper 41, too, is made of synthetic resin as in the case of conventional one, and they are molded as a monolithic construction with the sleeve 40 and the fixed bearing washer 50, respectively. As a result, the fixed side stopper 55 is molded and fixed to the guide bush 26. Incidentally, in FIG. 2 and FIG. 3, the guide bush 26, etc. are omitted and the fixed side stopper 55 only is described for simplification. These moving side stopper 41 and the fixed side stopper 55 have adequate rigidity and durability, and the side view is made to be relatively thin and long (the length of approximately 4~5 mm) and the plan view (FIG. 3) is made to be a comma-shaped bead positioned on the cocentric circle of radius r where the forward and the rear ends are semicircle shaped and both sides follow the track drawn by the aforementioned moving side stopper 45 rotated (spiral movement) around the shaft center 0 of the aforementioned shaft 35, and the width (thickness in the radial direction) is made to be constant (approximately 2 mm).

And to the moving side stopper 41, a clearance slope 41a is formed at its rear part, looking in the rotational direction, of the sleeve 40 to avoid contacting the fixed side stopper 55.

This clearance slope 41a is slanted toward upper side in the angle of α against the plane part (the length of La) in the front section. The length La at the aforementioned plane part is determined by taking the rigidity and durability into considerations, and it is defined to be approximtely 2 mm in this case (approximately ⅔ of the total length), and the aforementioned inclination α is defined as the angle slightly larger (for example, approximately 1.5°) than the rotationally lowering amount (slope) by the aforementioned moving side stopper 41, which is lowered in spiral movement, per 1 step (1 rotation equals 96 steps) of the aforementioned stepping motor 10.

Figure 4A:
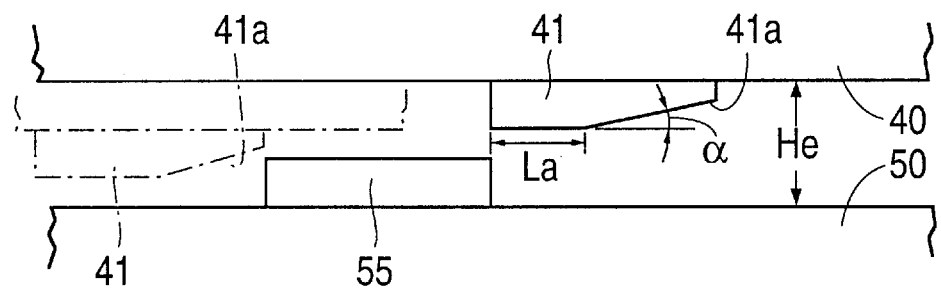
FIG. 4 is a drawing used to explain the stop operation by the moving side stopper and the fixed side stopper in a motor operated valve shown in FIG. 1.
Figure 7A:
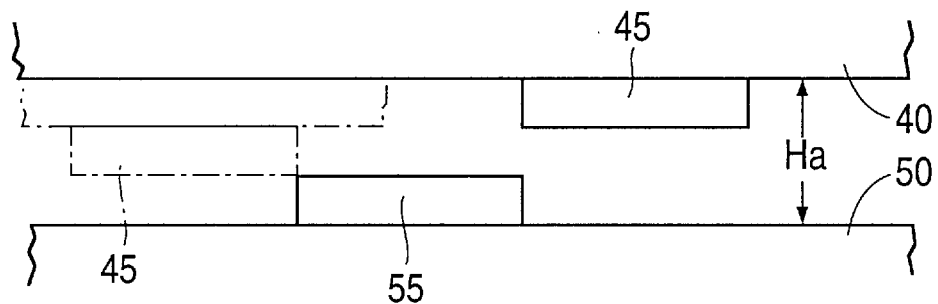
FIG. 7 is a drawing used to explain the stop operation by the moving side stopper and the fixed side stopper in a conventional motor operated valve.
Figure 7B:
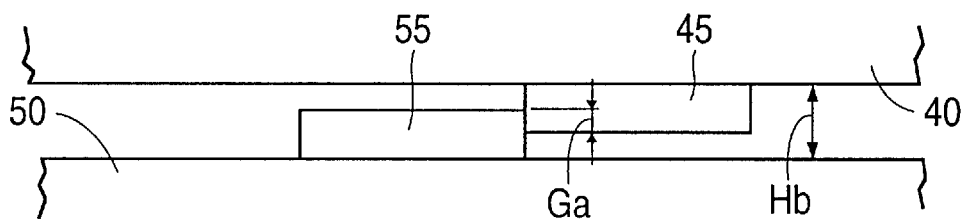
Figure 8:
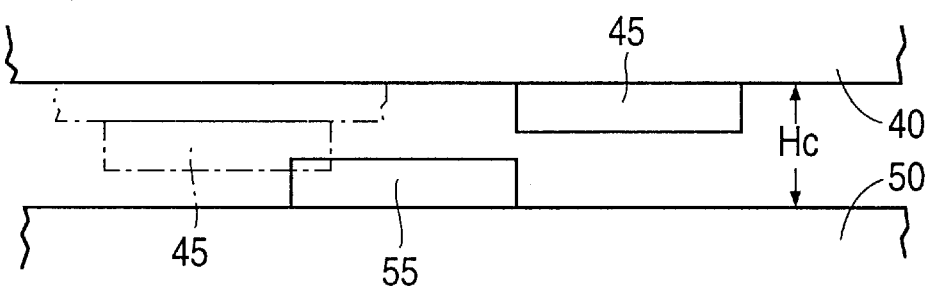
FIG. 8 is a drawing used to explain the problems with the conventional motor operated valve.

Even under such construction, the aforementioned moving side stopper 41 is rotationally lowered in spiral movement by the screw feeding due to screw fitting of the aforementioned female screw 27 and male screw 29, and at the time one rotation before the front part, looking in the rotational direction, hit the rear part of the fixed side stopper 55, the separation distance between the lower surface of the aforementioned sleeve 40 (upper edge of the moving side stopper 41) and the upper surface of the fixed bearing washer (lower edge of the fixed side stopper 55) is set to be shorter than Ha (FIG. 7) in the aforementioned conventional case and set as He as shown by the solid line in FIG. 4(A), which is almost the same as Hc as shown in FIG. 8.

As such, even if the separation distance at the time of one rotation before hitting is set short, because the clearance slope 41a is provided on the moving side stopper 41, when the moving side stopper 41 passes the fixed side stopper 55, the clearance slope 41a at the rear part lower surface is positioned higher than the front side upper surface of the fixed side stopper 55 causing no contact by the moving side stopper 41 to the fixed side stopper 55 resulting in no wearing or damage nor failure such as complete stop of the moving side stopper 41. Furthermore, similarly the tolerances of each part or variations caused during manufacturing are absorbed.

Figure 4B:
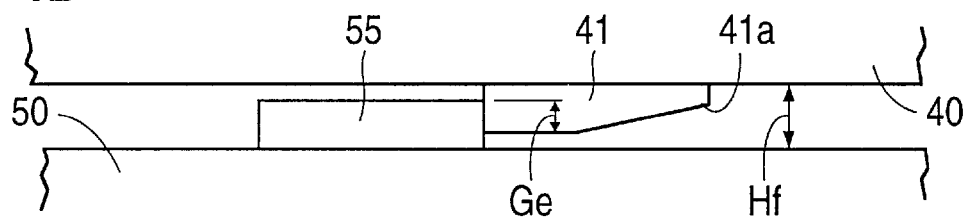

And, when the moving side stopper 41 is rotated one more time from the position indicated by the solid line in FIG. 4(A) and stopped by its front part hitting the rear part of the aforementioned fixed side stopper 55 as shown in FIG. 4(B), the separation distance between the aforementioned sleeve 40 and the fixed bearing washer 50 is defined as Hf which is He, the separation distance at the time of one rotation before, minus the lowering amount (in this case, approximately 0.6 mm, for example) equivalent to 1 pitch of the aforementioned female screw 27 and the male screw 29, and the contact width in the height direction when the moving side stopper 45 hit the fixed side stopper 55 is defined as Ge which is longer than Ga for the aforementioned conventional type.

Because the contact width between the aforementioned moving side stopper 41 and the fixed side stopper 55 is made to be longer than the conventional ones as explained above, in other words, because the height position of the moving side stopper 41 is made to be lower, damage, wearing, etc. to the moving side stopper 41 and the fixed side stopper 55 are decreased and the reliability in terms of rigidity and durability is increased.

As such, in the case of motor operated valve under this form of embodiment, by merely providing a simple modification of forming a clearance slope 41a to the moving side stopper 41, the undesirable contact between the moving side stopper 41 and the fixed side stopper 55 can be effectively avoided, and also the contact width at the time of hitting between the moving side stopper 41 and the fixed side stopper 55 can be maximized, resulting in decreased damages, wearings, etc. and reliability of the moving side stopper and the fixed side stopper in terms of rigidity and durability can be effectively improved.

Figure 5A:
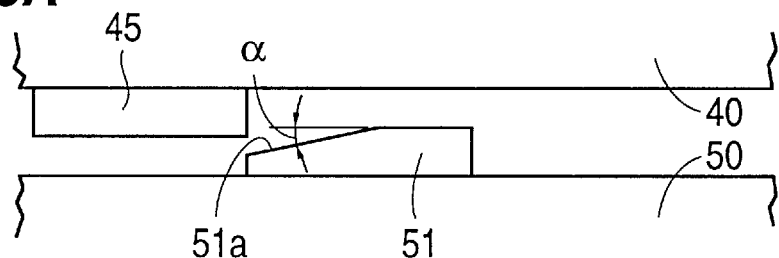
FIG. 5 is a drawing used to explain the deformed example of the principal part of the motor operated valve under this invention.
Figure 5B:
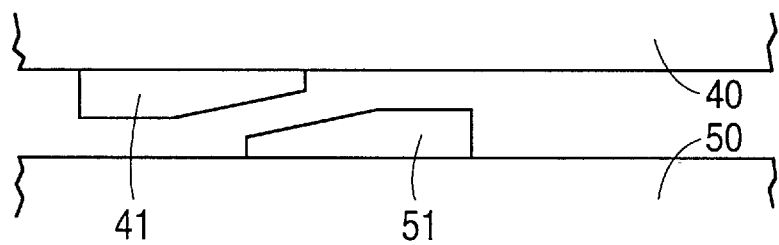

Incidentally, while the clearance slope 41a is provided to the moving side stopper 41 in the case of embodiment as described above, a similar effect can be obtained by providing a clearance slope 5la having a similar inclination α at the front part of the fixed side stopper 51 as shown in FIG. 5(A), and furthermore, if clearance slopes 41a and 51a are provided to both the moving side stopper 41 and the fixed side stopper 51, respectively, as shown in FIG. 5(B), the contact between the moving side stopper 41 and the fixed side stopper 51 can be avoided with extra margin, which is beneficial from the aspect of production (dimensional) control.

Furthermore, while the plan view shape of the stoppers, 41 and 51, are designated to be comma-shaped bead in the above example, it is not an absolute requirement, and of course, the plan view shape can be rectangle or ellipse. And the dimensions of each part or inclination described above are merely an example and they can be changed as appropriate.

Effects of the Invention

As it is clear from the above explanation, in the case of the motor operated valve under this invention, as a clearance slope to avoid hitting the other stopper is provided on at least one side, the moving side stopper rear part or the aforementioned fixed side stopper front part, even if the separation distance between the moving side stopper and the fixed side stopper at the time of one rotation before contact is set to be shorter than the conventional one, the moving side stopper rear part can be kept separated from the fixed side stopper front part when the moving side stopper passes the fixed side stopper. Furthermore, as the separation distance between the moving side stopper and the fixed side stopper at the time of one rotation before contact can be made shorter, the contact width at the time of hitting between the moving side stopper and the fixed side stopper can be maximized, and as a result, damage, wearing, etc. of the moving side stopper and the fixed side stopper can be reduced, and it has an excellent effect that their reliability in terms of rigidity and durability can be improved without requiring major modification to the conventional ones and at a low cost.

The entire disclosure of Japanese Patent Application No. 8-139013 filed on May 31, 1996, including the specification, abstracts, drawings and claims, is incorporated herein by reference in its entirety.

We claim:

1. A motor operated valve comprising a valve body having a fluid entrance, a shaft which opens or closes the aforementioned fluid entrance, a motor which drives the shaft, a moving side stopper which rotates by the rotation of the aforementioned shaft, and a fixed side stopper which is hit by the aforementioned moving side stopper, and where a clearance slope to avoid hitting is provided at least on one of the two sides, the aforementioned moving side stopper or the fixed side stopper.

2. A motor operated valve comprising a valve body having a fluid entrance, a shaft which is screw fed to open or close the aforementioned fluid entrance, a motor which rotationally drives the shaft, a sleeve having a convexed moving side stopper which is rotated with the aforementioned shaft as a monolithic structure, and a fixed bearing washer having a convexed fixed side stopper to which the aforementioned moving side stopper hits, and where a clearance slope to avoid contact when passing the other stopper is formed at least on one of the two sides, the aforementioned moving side stopper rear part or the aforementioned fixed side stopper front part when looking at the aforementioned sleeve in the rotational direction.

3. A motor operated valve as described in claim 2 above comprising the aforementioned sleeve and the moving side stopper molded as a monolithic structure using synthetic resin material, and the aforementioned fixed bearing washer and the fixed side stopper molded as a monolithic structure using synthetic resin material.

* * * * *